Patented Jan. 14, 1930

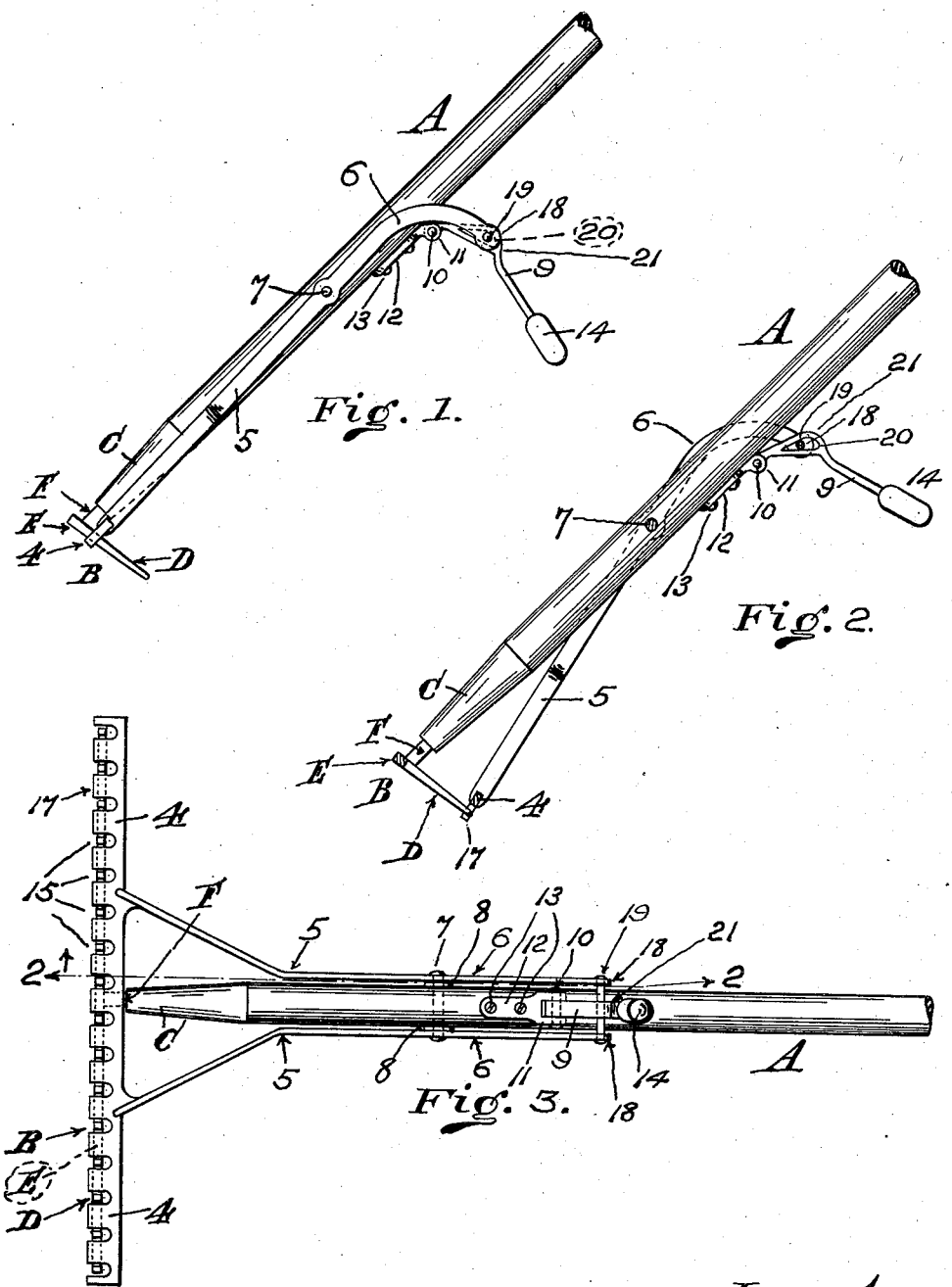

1,743,736

UNITED STATES PATENT OFFICE

WERNER A. SUNDQUIST, OF CINCINNATI, OHIO

SELF-CLEANING RAKE

Application filed March 27, 1929. Serial No. 350,370.

This invention relates to rake cleaners, or, more particularly speaking, to an accessory attachment on the rake handle for ready use in keeping the rake teeth free from choking or clogging and piled up by its gatherings as the implement is passed to and fro over the surface to be cleared of cut grass and rubbish or refuse, and it consists of a very simple, convenient, economical and efficient adjunct to a hand rake, whether of metal or wood, that will be fully hereinafter explained and set forth in connection with the following description of the accompanying sheet of drawings, in which—

Figure 1 is a side elevation showing the handle of the implement broken off toward its upper end and with my improved teeth-clearing adjunct or attachment mounted in its normal using place at the lower portion of the handle preparatory to the dumping or stripping action; Fig. 2, a sectional elevation taken on the line 2, 2, of Fig. 3, but in upright position and showing my improved clearing-adjunct in the act of dumping or relieving the teeth of the cut grass or other rubbish on the ground; and Fig. 3, a bottom plan view of the rake in refuse-clearing action.

A indicates the staff or the usual elongated wooden pole or handle of the rake whose upper grip-end is shown broken off and having at its fore or lower work-end the usual transverse toothed rake-head B and the reinforcing ferrule C. D indicates each one of the series of teeth projecting downwardly from the rake-head bar E in the ordinary form, said bar having at its center the usual fastening-tang F.

I will now proceed to describe the essential feature of my invention herein which refers to the refuse stripping or clearing device or attachment that forms a useful adjunct or accessory that may be very easily applied to the said lower work-end of the handle A. This cleaner or stripper adjunct is composed of a main transverse stripper-bar 4; a coinciding pair of forwardly-extending and outwardly-spreading or diverging levers 5, 5, that have rearwardly-extending downwardly-curved arms 6, 6, and that are pivotally mounted and freely swung on a transverse pin 7 extending through the handle and riveted or otherwise suitably fastened or secured in place above the fore end of the handle, with washers 8, 8, preferably intervening to reduce binding or retarding friction; a rocker-arm 9 pivotally mounted at its fore end on a transverse pin 10 that is riveted at its opposite ends in the forked bearing-arms 11 of a plate 12, the latter, in turn, being attached by several screws or the like 13, 13, on the lower face of the handle; and a weight 14 extending downwardly from said rocker-arm 9 and really forming a vital constituent part thereof.

Referring, however, in more minute detail to the said enumerated parts of the stripper device, it will be readily seen that the main stripper-bar 4 is provided with a series or row of notches 15 that respectively coincide with the said series or row of rake teeth D, which latter they freely span, such notches 15 being somewhat wider than the thickness of said rake teeth and, also, that the extreme fore ends of the levers 5, 5, are bifurcated or notched so as to rigidly engage or securely span, in a pinched and soldered manner or the like, the lugs 16 that form corner braces that are preferably made integral with the inner edge of the said stripper-bar 4 for reciprocating the said stripper-bar so that its broad stripper-teeth 17, at either side of said notches 15 freely engage the said rake teeth in the rocking reciprocal movement of the levers 5, 5, by means of the automatic rearwardly-swinging action and heft or inertia of the weighted rocker-arm 9 and the connecting pair of rear-arms 6, 6, when the rake is drawn backwardly and ready for the next stroke forwardly in the raking or cleaning of the cut grass and other deposits on the surface to be cleared. The tips or extreme rear ends 18 of the said pair of rear-arms 6, 6, are united by means of a riveted transverse pin 19 whose opposite ends pass through the elongated opening or triangular-shape cam-slot 20 made in the enlarged portion 21 of the said rocker-arm 9 for the desired quick accelerated movements of the fore stripper or cleaner end or refuse-removing bar of the said essential feature of the invention herein, as the work of the implement or tool advances toward the final gathering-result contemplated by its use. A very simple short backward jerk or quick shake of the rake, with my stripping-adjunct mounted at its fore end and the inertia of the weighted rocker-arm, readily release and instantly drop all the gatherings when the rake has been drawn backward in collecting the refuse or rubbish or the cut grass on the surface, and deposits such rakings in rows that can be readily gathered and still further assembled into cocks or piles for final disposition or removal. In the event of the stripping device clogging at any time or the weighted-arm failing to perform fully and freely in an automatic manner, the user can readily grasp hold of the weighted end of the rocker-arm, as a handle, to force the action of said stripper under the decided leverage of said rear-arms 6, 6, and the levers 5, 5, which will usually be ample for such unusual purpose and condition.

It will be obvious that my device can be readily mounted on any ordinary form of rake and removed likewise therefrom, for replacing or repairs, or when it is desired to use the implement without it if desired.

I claim:—

A self-cleaning rake for lawns and the like comprising a handle, a transverse toothed head or rake-bar, a crop or rubbish stripper-bar having a series of notches coinciding with the respective teeth of said rake-bar and adapted to be reciprocated along said teeth, a pair of outwardly-spreading or diverging levers mounted to pivot on the said handle and for attachment at their fore ends to the said stripper-bar, a pair of rearwardly-extending arms provided at the pivot points of said levers and connected at their rear ends by means of a transverse pin, a rocker-arm pivotally mounted on the underside of the rake handle back of the said pivot points of the levers and having an enlarged slotted or cam formation adapted to engage said transverse pin and a weight-member on said rocker-arm adapted to automatically augment or accelerate the movements of the said arms and levers into active reciprocal force on said stripper-bar for releasing the crop or rubbish from the rake teeth at the time the end of the filling-stroke is reached, substantially as shown and described.

In testimony whereof I hereunto affix my signature.

WERNER A. SUNDQUIST.